United States Patent
Murakami

(10) Patent No.: US 10,622,855 B2
(45) Date of Patent: Apr. 14, 2020

(54) PERMANENT MAGNET ELECTRIC MOTOR

(71) Applicant: FUJITSU GENERAL LIMITED, Kanagawa (JP)

(72) Inventor: Masanori Murakami, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 91 days.

(21) Appl. No.: 15/928,581

(22) Filed: Mar. 22, 2018

(65) Prior Publication Data

US 2018/0278105 A1    Sep. 27, 2018

(30) Foreign Application Priority Data

Mar. 23, 2017    (JP) .................................. 2017-058290

(51) Int. Cl.
*H02K 1/27*    (2006.01)
*H02K 1/28*    (2006.01)
(Continued)

(52) U.S. Cl.
CPC ................. *H02K 1/28* (2013.01); *H02K 1/04* (2013.01); *H02K 1/278* (2013.01); *H02K 1/2753* (2013.01);
(Continued)

(58) Field of Classification Search
CPC .. H02K 1/00; H02K 1/22; H02K 1/24; H02K 1/27; H02K 1/276; H02K 1/278; H02K 1/28; H02K 1/30; H02K 5/00; H02K 5/04; H02K 5/15; H02K 5/16; H02K 5/161; H02K 15/00; H02K 15/02
See application file for complete search history.

(56) References Cited

U.S. PATENT DOCUMENTS

2012/0038229 A1 *    2/2012    Watanabe ................ H02K 1/30
                                                                    310/43

FOREIGN PATENT DOCUMENTS

CN        201623555 U    11/2010
EP          2975743 A1      1/2016
(Continued)

OTHER PUBLICATIONS

Aug. 28, 2018, European Search Report issued for related EP Application No. 18163410.6.

*Primary Examiner* — Tran N Nguyen
(74) *Attorney, Agent, or Firm* — Paratus Law Group, PLLC

(57) ABSTRACT

A rotor includes permanent magnets, an annular outer periphery side iron core (first core) disposed on the inner diameter side of the permanent magnets, an annular inner periphery side iron core (second core) disposed on the inner diameter side of the first core, and an insulating member insulating the first core and the second core from each other. The first core includes positioning convex portions protruding from the outer periphery toward the outer diameter side, formed in the circumferential direction and positioning the permanent magnets, and outer periphery side rotation locking concave portions being concave from the inner periphery toward the outer diameter side and formed in the circumferential direction. The positioning convex portions and the outer periphery side rotation locking concave portions are formed in positions overlapping each other when viewed in the radial direction from the central axis of the second core.

3 Claims, 5 Drawing Sheets

(51) Int. Cl.
*H02K 1/30* (2006.01)
*H02K 1/04* (2006.01)
*H02K 5/173* (2006.01)
*H02K 5/15* (2006.01)
*F04D 25/06* (2006.01)
*F24F 7/007* (2006.01)

(52) U.S. Cl.
CPC ............... *H02K 1/30* (2013.01); *F04D 25/06* (2013.01); *F24F 7/007* (2013.01); *H02K 5/15* (2013.01); *H02K 5/1732* (2013.01); *H02K 2203/12* (2013.01)

(56) References Cited

FOREIGN PATENT DOCUMENTS

| | | |
|---|---|---|
| JP | 2015-106928 A | 6/2015 |
| WO | WO 2014/082423 A1 | 6/2014 |
| WO | WO 2015/196604 A1 | 12/2015 |

\* cited by examiner

PERMANENT MAGNET ELECTRIC MOTOR

CROSS-REFERENCE TO RELATED APPLICATION

The present application claims the benefit of priority of Japanese Patent Application No. 2017-058290, filed on Mar. 23, 2017, which is incorporated herein by reference.

TECHNICAL FIELD

The present invention relates to a permanent magnet electric motor provided with a rotor having an insulating member.

BACKGROUND ART

A permanent magnet electric motor of an inner rotor type is known in which a rotor having permanent magnets is rotatably disposed inside a stator that generates a rotating magnetic field. This permanent magnet electric motor is used, for example, for rotating a blower fan mounted on an air conditioner. When this permanent magnet electric motor is driven by a PWM inverter that performs high-frequency switching, a potential difference (axial voltage) occurs between the inner ring and the outer ring of the bearing, and when this axial voltage reaches the breakdown voltage of the oil film inside the bearing, current flows inside the bearing to cause electrolytic corrosion inside the bearing. To prevent this electrolytic corrosion of the bearing, for example, a permanent magnet electric motor provided with a rotor having an insulating member is known.

This rotor is provided with, for example, a plurality of permanent magnets annularly arranged at regular intervals, an annular outer periphery side iron core disposed on the inner diameter side of the plurality of permanent magnets, an annular inner periphery side iron core disposed on the inner diameter side of the outer periphery side iron core, an insulating member formed of a resin between the outer periphery side iron core and the inner periphery side iron core and insulating the outer periphery side iron core and the inner periphery side iron core from each other, and a shaft fixed to a through hole passing through along the central axis of the inner periphery side iron core.

As a rotor constructed like this, a structure is known in which the outer periphery side iron core is provided with a plurality of outer periphery side rotation locking concave portions that are concave from the inner periphery toward the outer diameter side and formed at regular intervals in the circumferential direction, the inner periphery side iron core is provided with a plurality of inner periphery side rotation locking concave portions that are concave from the outer periphery toward the inner diameter side and formed at regular intervals in the circumferential direction and by the insulating member being filled in the outer periphery side rotation locking concave portions and the inner periphery side rotation locking concave portions, the rotation locking of the outer periphery side iron core and the inner periphery side iron core with the insulating member is performed (for example, see JP-A-2015-106928).

In the structure disclosed in JP-A-2015-106928, when a plurality of outer periphery side rotation locking concave portions are formed so as to be concave from the inner periphery toward the outer diameter side as the outer periphery side iron core of the rotor, since the thickness in the radial direction of the outer periphery side iron core is small at the parts of the outer periphery side rotation locking concave portions, there is a possibility that strength decrease occurs at these parts of the outer periphery side rotation locking concave portions.

Because of such strength decrease at the parts of the outer periphery side rotation locking concave portions, for example, there is a possibility that the outer periphery side iron core is deformed in the radial direction at the parts of the outer periphery side rotation locking concave portions by the molding pressure when the outer periphery side iron core, the inner periphery side iron core and permanent magnets are disposed inside a metal mold and a resin is poured into the metal mold to mold the insulating member. When the outer periphery side iron core is deformed, the inner periphery side of the permanent magnet is stressed, so that there is a possibility that a crack occurs on the permanent magnet to break the permanent magnet.

SUMMARY OF THE INVENTION

In view of the above-mentioned problem, an object of the present invention is to provide a permanent magnet electric motor provided with a rotor capable of ensuring the strength of the outer periphery side iron core when a plurality of outer periphery side rotation locking concave portions are formed on the inner periphery of the outer periphery side iron core.

To solve the above-mentioned problem, a permanent magnet electric motor of the present invention is provided with a stator and a rotor disposed inside the stator, and the rotor is provided with: a plurality of permanent magnets arranged annularly; an annular outer periphery side iron core disposed on the inner diameter side of the plurality of permanent magnets; an annular inner periphery side iron core disposed on the inner diameter side of the outer periphery side iron core; an insulating member formed of a resin between the outer periphery side iron core and the inner periphery side iron core and insulating the outer periphery side iron core and the inner periphery side iron core from each other; and a shaft provided along the central axis of the inner periphery side iron core.

The outer periphery side iron core is provided with: a plurality of positioning convex portions protruding from the outer periphery toward the outer diameter side, formed in the circumferential direction and positioning the permanent magnets; and a plurality of outer periphery side rotation locking concave portions being concave from the inner periphery toward the outer diameter side and formed in the circumferential direction.

On the outer periphery side iron core, the positioning convex portions and the outer periphery side rotation locking concave portions are formed in positions overlapping each other when viewed in the radial direction from the central axis of the inner periphery side iron core.

According to the permanent magnet electric motor of the present invention, the strength of the outer periphery side iron core can be ensured by disposing in appropriate positions the positioning convex portions and the outer periphery side rotation locking concave portions formed on the outer periphery side iron core.

DETAILED DESCRIPTION

<General Structure of Motor>

Figure 1:
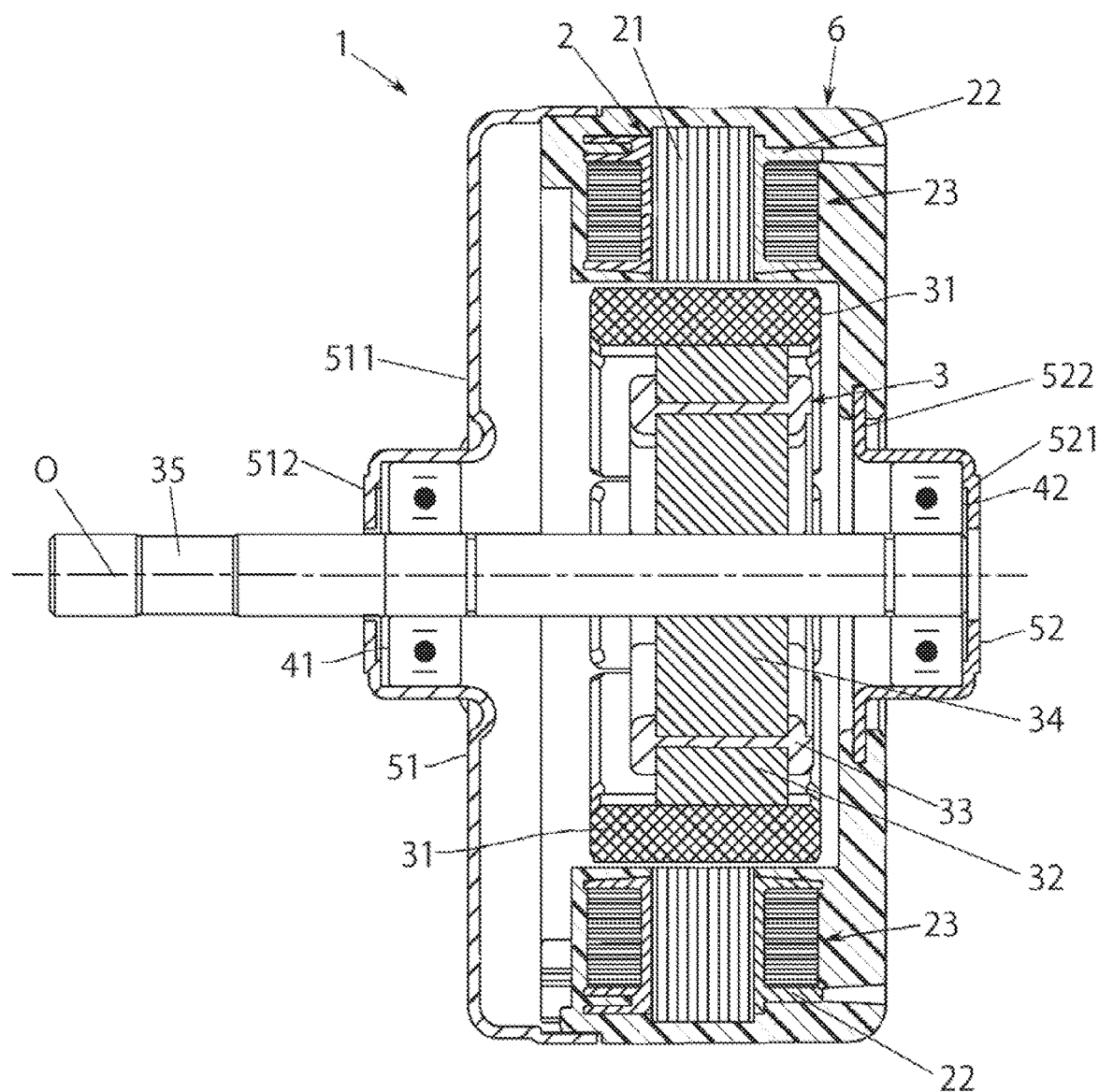
FIG. 1 is a schematic cross-sectional view showing a permanent magnet electric motor provided with a rotor of the present invention.

Hereinafter, an embodiment of the present invention will be described in detail based on the attached drawings. FIGS. 1 to 4 are views explaining the structure of a permanent magnet electric motor 1 in the present embodiment. As shown in FIGS. 1 to 4, this permanent magnet electric motor 1 is, for example, a brushless DC motor, and used for rotating the blower fan mounted on the indoor equipment of an air conditioner. Hereinafter, the permanent magnet electric motor 1 of an inner rotor type in which a rotor 3 having permanent magnets 31 is rotatably disposed inside a stator 2 generating a rotating magnetic field will be described as an example. The permanent magnet electric motor 1 in the present embodiment is provided with the stator 2, the rotor 3, a first bearing 41, a second bearing 42, a first bracket 51 and a second bracket 52.

<Stator and Rotor>

The stator 2 is provided with a stator iron core 21 having a cylindrical yoke portion and a plurality of teeth portions extending from the yoke portion toward the inner diameter side, and a winding 23 is wound on the teeth portions through an insulator 22. This stator 2 is covered with a motor outer shell 6 made of a resin except for the inner periphery of the stator iron core 21. The rotor 3 has a plurality of permanent magnets 31 and a shaft 35, and the plurality of permanent magnets 31 are annularly arranged around the shaft 35 through an outer periphery side iron core 32, an insulating member 33 and an inner periphery side iron core 34 described later. This rotor 3 is rotatable disposed with a predetermined gap on the inner periphery side of the stator iron core 21 of the stator 2.

<Bearings and Brackets>

The first bearing 41 supports one end side (the output side) of the shaft 35 of the rotor 3. The second bearing 42 supports the other end side (the side opposite to the output side) of the shaft 35 of the rotor 3. As the first bearing 41 and the second bearing 42, for example, ball bearings are used.

The first bracket 51 is made of a metal (a steel sheet, aluminum, etc.), and is fixed to the motor outer shell 6 on the one end side of the shaft 35 of the rotor 3. The first bracket 51 has a cylindrical bracket body portion 511 having a bottom surface and a first bearing accommodating portion 512 provided on the bottom surface for accommodating the first bearing 41. The bracket body portion 511 of the first bracket 51 is press-fitted to the outer periphery of the motor outer shell 6. The first bearing accommodating portion 512 of the first bracket 51 is formed in a cylindrical shape having a bottom surface and has a hole at the center of the bottom surface, and the one end side of the shaft 35 protrudes from this hole.

The second bracket 52 is made of a metal (a steel sheet, aluminum, etc.), and is disposed on the motor outer shell 6 on the other end side of the shaft 35 of the rotor 3. The second bracket 52 has a second bearing accommodating portion 521 for accommodating the second bearing 42 and a flange portion 522 spreading around the second bearing accommodating portion 521. The second bearing accommodating portion 521 of the second bracket 52 is formed in a cylindrical shape having a bottom surface, and the flange portion 522 of the second bracket 52 is partly covered with a resin and is integral with the motor outer shell 6.

The first bearing 41 is accommodated in the first bearing accommodating portion 512 provided on the first bracket 51, the second bearing 42 is accommodated in the second bearing accommodating portion 521 provided on the second bracket 52, and the first bearing 41 and the first bearing accommodating portion 512, and the second bearing 42 and the second bearing accommodating portion 521 are electrically conducted with each other.

<Concrete Structure of Rotor>

Figure 2A:
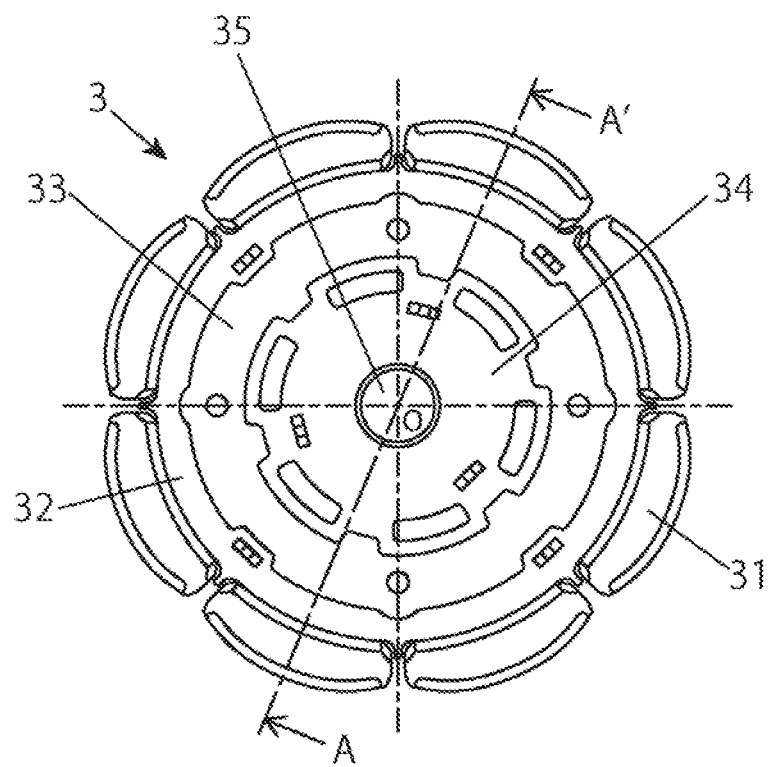
FIG. 2A is a plan view of the rotor of the present invention.
Figure 2B:
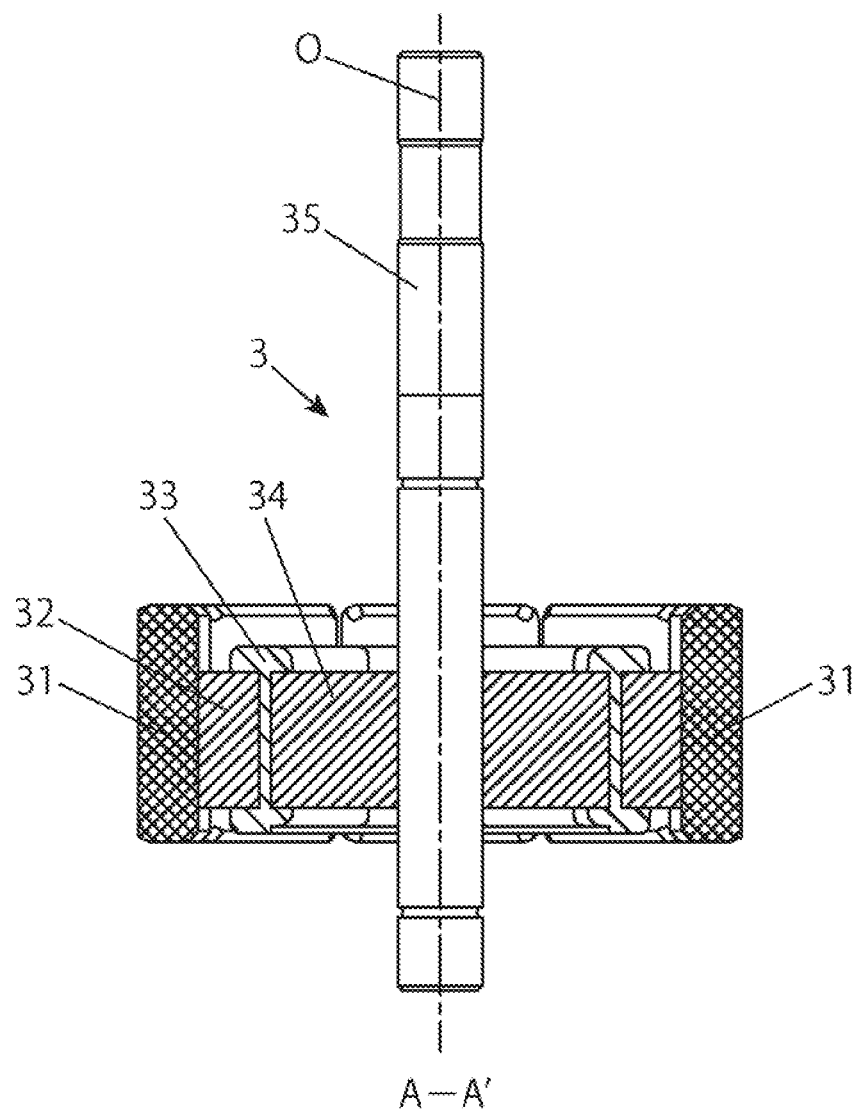
FIG. 2B is an A-A' cross-sectional view of FIG. 2A.
Figure 3:
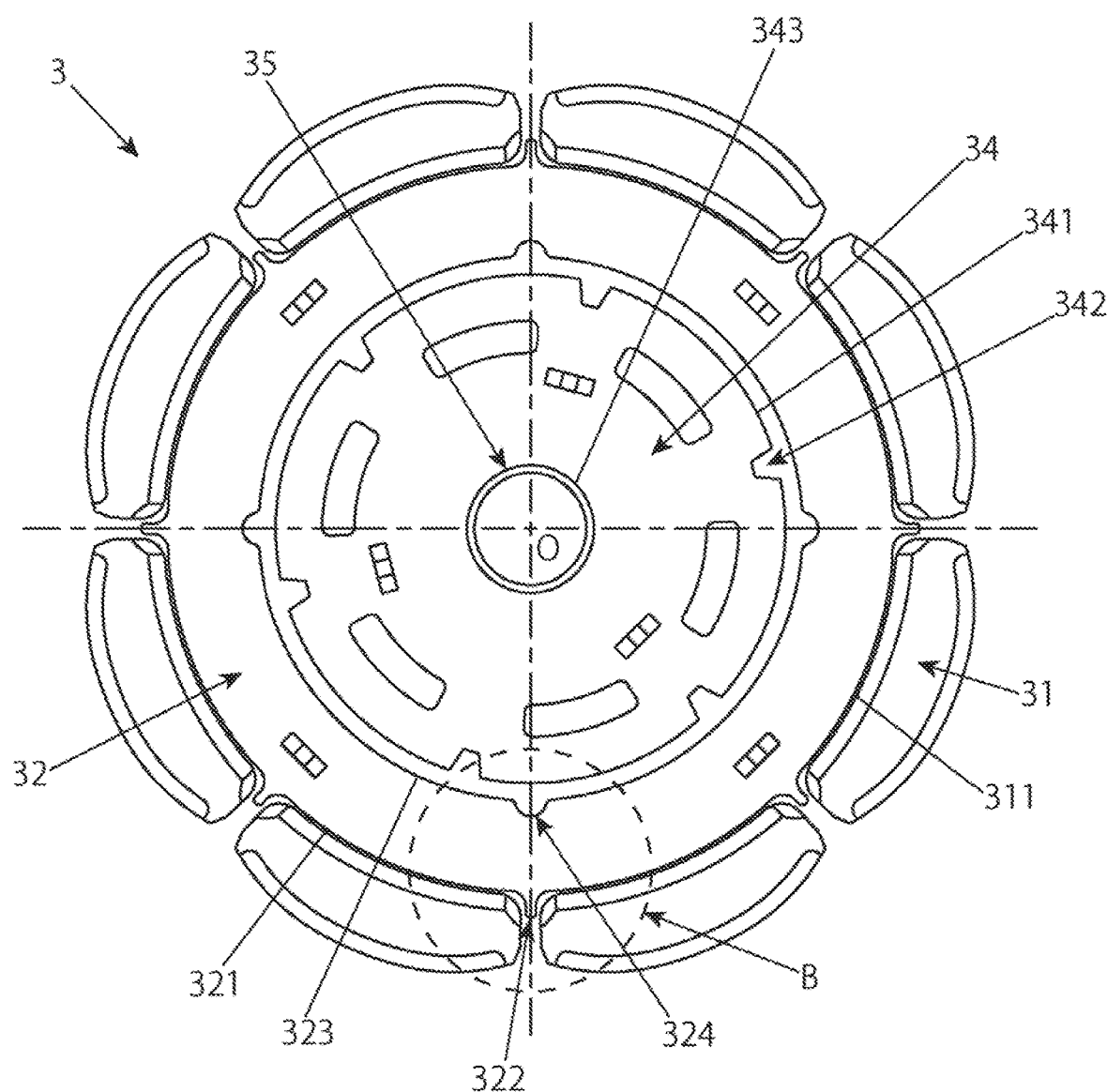
FIG. 3 is a plan view showing the condition where an insulating member of the rotor shown in FIG. 2A is removed.

In the permanent magnet electric motor 1 structured as described above, in order to prevent electrolytic corrosion of the first bearing 41 and the second bearing 42, as shown in FIG. 1, the rotor 3 is provided with the insulating member 33. Hereinafter, an embodiment of the rotor 3 will be described. The rotor 3 is provided with, as shown in FIGS. 2A, 2B and 3, from the outer diameter side to the inner diameter side the plurality of permanent magnets 31, the outer periphery side iron core 32, the insulating member 33, the inner periphery side iron core 34 and the shaft 35.

The plurality of (for example, eight) permanent magnets 31 are annularly arranged around the shaft 35 so that the N-pole and the S-pole alternately appear at regular intervals in the circumferential direction. The outer periphery side iron core 32 is formed in an annular shape, and disposed on the inner diameter side of the plurality of permanent magnets 31. The outer periphery side iron core 32 is provided with, in order to position the plurality of permanent magnets 31, a plurality of (for example, eight) positioning convex portions 322 protruding from an outer periphery 321 toward the outer diameter side. The plurality of positioning convex portions 322 extend on the outer periphery 321 in a direction along the central axis O and are formed at regular intervals in the circumferential direction, and the permanent magnets 31 are positioned between the adjoining two positioning convex portions 322 one at each interval. Moreover, the outer periphery side iron core 32 is provided with, for rotation locking with the insulating member 33 described later, a plurality of (for example, four) outer periphery side rotation locking concave portions 324 concave from an inner periphery 323 toward the outer diameter side. The plurality of outer periphery side rotation locking concave portions 324 extend on the inner periphery 323 in a direction along the central axis O and are formed at regular intervals in the circumferential direction.

The inner periphery side iron core 34 is formed in an annular shape, and disposed on the inner diameter side of the outer periphery side iron core 32. The inner periphery side iron core 34 is provided with, for rotation locking with the insulating member 33 described later, a plurality of (for example, six) inner periphery side rotation locking concave portions 342 concave from an outer periphery 341 toward the inner diameter side. The plurality of inner periphery side rotation locking concave portions 342 extend on the outer periphery 341 in a direction along the central axis O and are formed at regular intervals in the circumferential direction. Moreover, the inner periphery side iron core 34 is provided with a through hole 343 passing through along the central axis O of the inner periphery side iron core 34.

The insulating member 33 is made of a dielectric resin such as PBT or PET, and disposed between the outer periphery side iron core 32 and the inner periphery side iron core 34. The insulating member 33 is molded integrally with the outer periphery side iron core 32 and the inner periphery side iron core 34 by the resin being filled between the outer periphery side iron core 32 and the inner periphery side iron core 34, the outer periphery side iron core 32 and the inner periphery side iron core 34 are insulated from each other, and the inner ring side potentials of the first bearing 41 and the second bearing 42 are reduced to make the potentials of the inner ring side and the outer ring side coincide with each other, thereby preventing electrolytic corrosion of the first bearing 41 and the second bearing 42. The shaft 35 is fastened to the through hole 343 provided in the inner periphery side iron core 34 by press fitting or swaging.

<Structure, Workings and Advantage of Rotor Related to Present Invention>

Next, in the permanent magnet electric motor 1 in the present embodiment, using FIGS. 3 and 4, the structure, workings and advantage of the permanent magnet electric motor 1 related to the present invention will be described. In the above-described structure of the rotor 3, as mentioned in the section of problem that the invention is to solve, when the plurality of outer periphery side rotation locking concave portions 324 are formed so as to be concave from the inner periphery 323 toward the outer diameter side as the outer periphery side iron core 32, the following problems arise:

On the outer periphery side iron core 32, since the thickness in the radial direction of the outer periphery side iron core 32 is small at the parts of the outer periphery side rotation locking concave portions 324, there is a possibility that strength decrease occurs at these parts of the outer periphery side rotation locking concave portions 324. Because of such strength decrease at the parts of the outer periphery side rotation locking concave portions 324, for example, there is a possibility that the outer periphery side iron core 32 is deformed in the radial direction at the parts of the outer periphery side rotation locking concave portions 324 by the molding pressure when the outer periphery side iron core 32, the inner periphery side iron core 34 and the permanent magnets 31 are disposed and a resin is poured into the metal mold to mold the insulating member 33. When the outer periphery side iron core 32 is deformed, the sides of inner peripheries 311 of the permanent magnets 31 are stressed, so that there is a possibility that a crack occurs on the permanent magnets 31 to break the permanent magnets 31.

Figure 4:
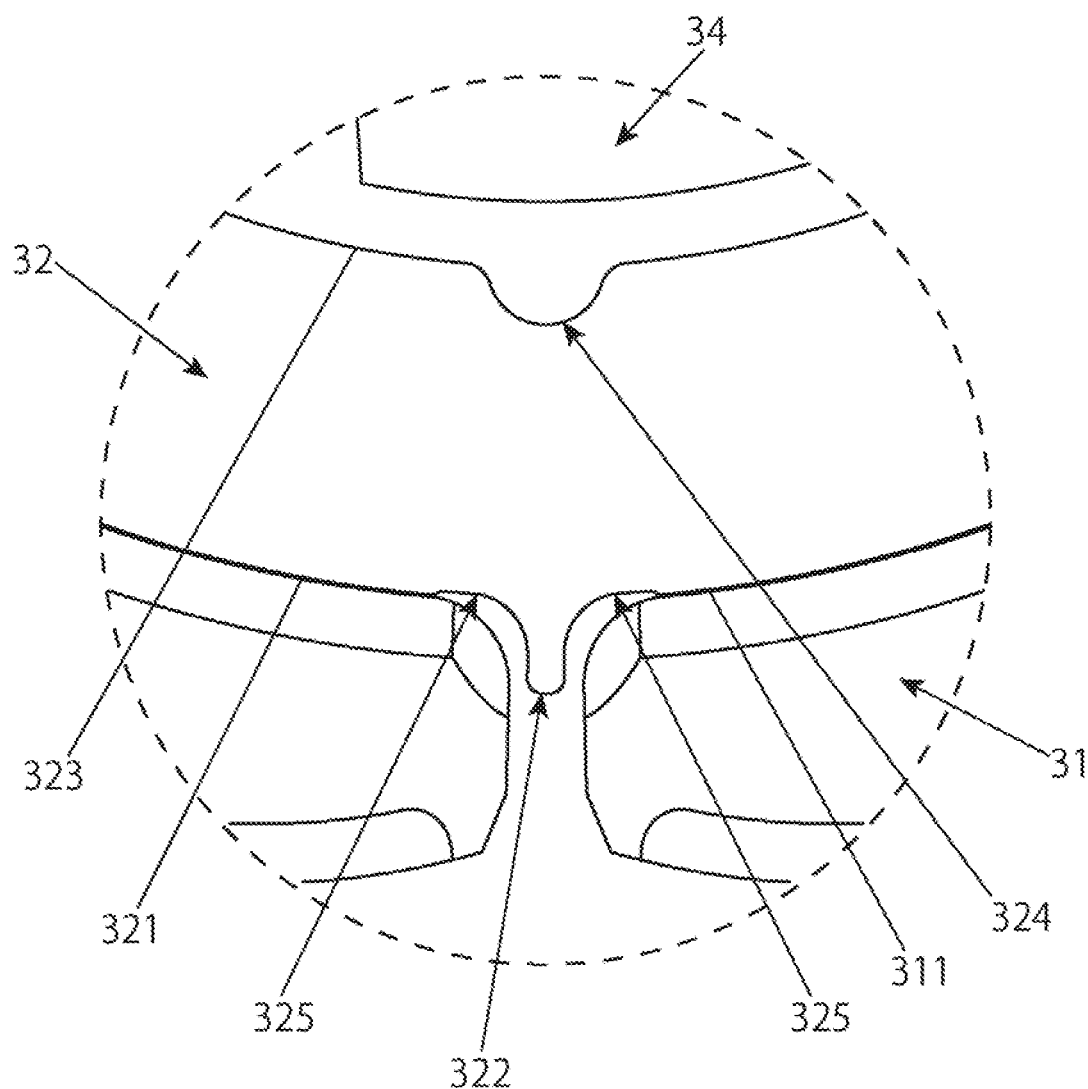
FIG. 4 is a relevant part plan view showing the part, surrounded by the circle indicated by the arrow B, of the rotor shown in FIG. 3.

Accordingly, in the rotor 3 of the present embodiment, as shown in FIG. 4, the positioning convex portions 322 and the outer periphery side rotation locking concave portions 324 of the outer periphery side iron core 32 are formed in positions overlapping each other when viewed in the radial direction from the central axis O of the inner periphery side iron core 34. As a consequence, since the positioning convex portions 322 are formed on the outer periphery 321 on the extension in the radial direction of the outer periphery side rotation locking concave portions 324, the reduction in thickness of the parts of the outer periphery side rotation locking concave portions 324 can be compensated for by the positioning convex portions 322. Consequently, the thickness in the radial direction of the outer periphery side iron core 32 is prevented from becoming thin at the parts of the outer periphery side rotation locking concave portions 324, so that strength can be ensured at the parts of the outer periphery side rotation locking concave portions 324. By thus disposing the positioning convex portions 322 and the outer periphery side rotation locking concave portions 324 formed on the outer periphery side iron core 32 in appropriate positions, the strength of the parts of the outer periphery side rotation locking concave portions 324 is ensured to suppress the deformation of the outer periphery side iron core 32, so that it can be prevented that a crack occurs on the permanent magnets 31 to break the permanent magnets 31.

Further, in the rotor 3 according to the present embodiment, as shown in FIG. 4, outer periphery side concave portions 325 that are slightly concave from the outer periphery 321 toward the inner diameter side may be formed on both sides of the positioning convex portions 322 of the outer periphery side iron core 32. As a consequence, since the slightly concave outer periphery side concave portions 325 are formed on both sides of the positioning convex portions 322 of the outer periphery side iron core 32, a slight space is formed between the permanent magnets 31 disposed on the outer periphery 321 between the adjoining two positioning convex portions 322 and the outer periphery side concave portions 325. Consequently, while strength at the parts of the outer periphery side rotation locking concave portions 324 is ensured to suppress the deformation of the outer periphery side iron core 32, the formation of this slight space prevents the deformation of the outer periphery side iron core 32 from being directly transmitted to the inner peripheries 311 of the permanent magnets 31 at the time of molding of the insulating member 33.

The invention claimed is:

1. A permanent magnet electric motor, comprising a stator and a rotor disposed inside the stator, wherein the rotor is provided with:
    a plurality of permanent magnets arranged annularly;
    an annular outer periphery side iron core disposed on an inner diameter side of the plurality of permanent magnets;
    an annular inner periphery side iron core disposed on an inner diameter side of the outer periphery side iron core;
    an insulating member formed of a resin between the outer periphery side iron core and the inner periphery side iron core and insulating the outer periphery side iron core and the inner periphery side iron core from each other; and
    a shaft provided along a central axis of the inner periphery side iron core,
    wherein the outer periphery side iron core is provided with:
    a plurality of positioning convex portions protruding from an outer periphery toward an outer diameter side, formed in a circumferential direction and positioning the permanent magnets;
    a plurality of rotation locking concave portions being concave from an inner periphery toward the outer diameter side and formed in the circumferential direction; and
    a plurality of outer periphery side concave portions being concave from the outer periphery toward the inner diameter side and formed in the circumferential direction, and
    wherein on the outer periphery side iron core, each rotation locking concave portion is formed in a respective position overlapping one of the plurality of positioning convex portions when viewed in a radial direction from the central axis of the inner periphery side iron core.

2. The permanent magnet electric motor according to claim 1, wherein the plurality of outer periphery side concave portions are formed on both circumferential sides of each positioning convex portion.

3. The permanent magnet electric motor according to claim 1, wherein the insulating member is formed by integrally molding the resin with the outer periphery side iron core and the inner periphery side iron core.

* * * * *